(12) United States Patent
Munsell et al.

(10) Patent No.: US 11,191,282 B2
(45) Date of Patent: Dec. 7, 2021

(54) PROCESSING AND PRESERVING A KAVA PRODUCT AND PROCESS OF MAKING IT STABLE

(71) Applicants: Michael Munsell, Billings, MT (US); Zbigniew Dumienski, Auckland (NZ)

(72) Inventors: Michael Munsell, Billings, MT (US); Zbigniew Dumienski, Auckland (NZ)

(73) Assignees: Michael Munsell, Billings, MT (US); Zbigniew Dumienski, Auckland (NZ)

( * ) Notice: Subject to any disclaimer, the term of this patent is extended or adjusted under 35 U.S.C. 154(b) by 8 days.

(21) Appl. No.: 16/271,848

(22) Filed: Feb. 10, 2019

(65) Prior Publication Data

US 2020/0253225 A1    Aug. 13, 2020

(51) Int. Cl.
  *A23B 7/005*    (2006.01)
  *A23L 3/015*    (2006.01)
  *A23B 7/04*    (2006.01)
  *A23L 3/36*    (2006.01)
  *A23L 33/105*    (2016.01)
  *A23L 3/16*    (2006.01)

(52) U.S. Cl.
  CPC ............... *A23B 7/005* (2013.01); *A23B 7/04* (2013.01); *A23L 3/015* (2013.01); *A23L 3/16* (2013.01); *A23L 3/36* (2013.01); *A23L 33/105* (2016.08); *A23V 2002/00* (2013.01)

(58) Field of Classification Search
  CPC ........... A23L 33/105; A23L 3/015; A23L 3/16; A23L 3/3463; A23L 3/36; A23B 7/005; A23B 7/04; A23V 2002/00
  USPC ......................................................... 426/52
  See application file for complete search history.

(56) References Cited

U.S. PATENT DOCUMENTS

2008/0317924 A1*  12/2008  Yang ..................... A47J 31/401
                                                        426/541
2013/0177672 A1*   7/2013  Robinson ................. A23F 3/30
                                                         426/72

OTHER PUBLICATIONS

Abdullah, S. A. et al. Food Sci. Biotechnol. 22: 961-966 (Year: 2013).*
Yook, H-S, et al. Korean J. Food Sci. Technol. 30: 581-589 (Year: 1998).*

* cited by examiner

*Primary Examiner* — Hamid R Badr
(74) *Attorney, Agent, or Firm* — Dave Law Group LLC; Raj S. Dave

(57) ABSTRACT

Embodiments herein relate to one or more methods comprising heating of a kava product; pressurizing the kava product, electrically pulsing the kava product, homogenizing the kava product or combinations thereof; cooling the kava product; wherein the method is configured to stabilize the kava product against microbiological decomposition or reduce microbial count in order to improve safety and extend shelf life under refrigeration and/or at ambient temperature.

17 Claims, 2 Drawing Sheets

FIG. 1: Viscoelasticity Temperature Sweep plot
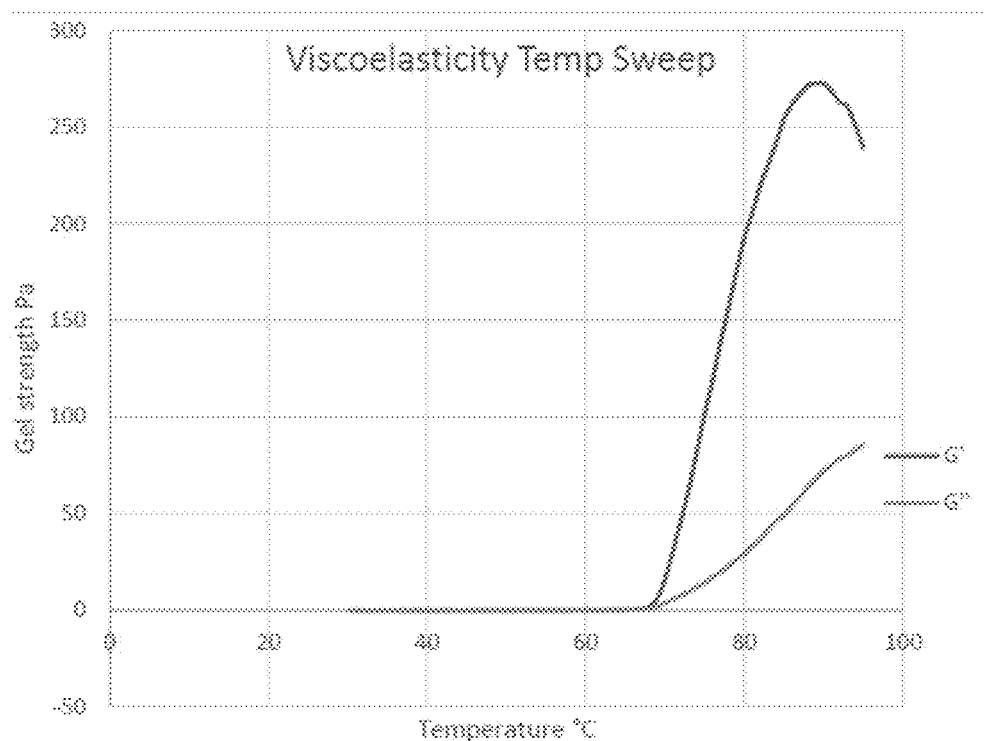

FIG. 2: Particle Size Distribution Plot
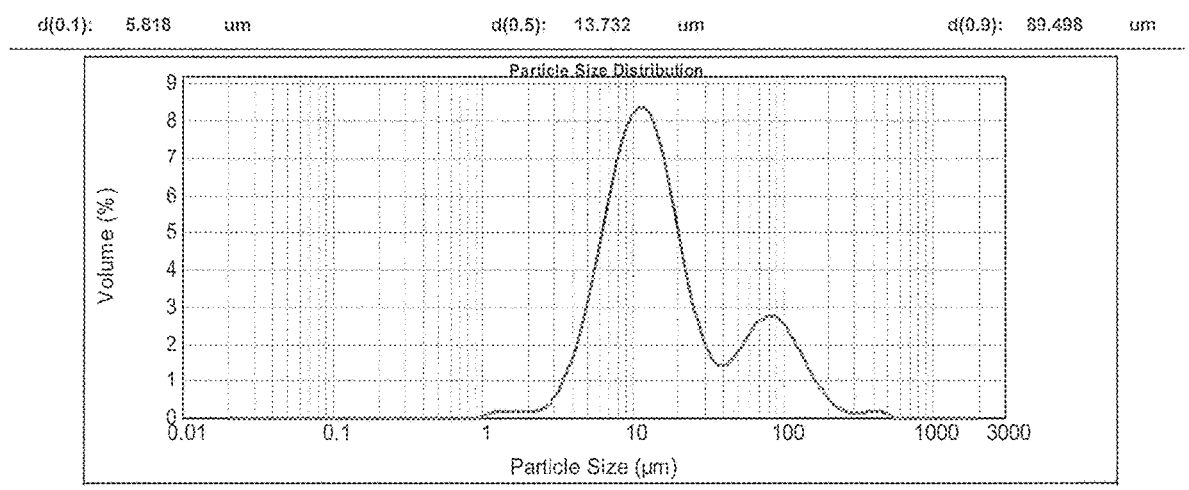

PROCESSING AND PRESERVING A KAVA PRODUCT AND PROCESS OF MAKING IT STABLE

RELATED APPLICATIONS

This application is related to U.S. patent application Ser. No. 15/899,383, filed Feb. 20, 2018, entitled ENHANCED KAVA EXTRACT, METHOD OF MAKING THE SAME, AND COMPOSITIONS THEREOF, U.S. patent application Ser. No. 15/899,385, filed Feb. 20, 2018, entitled ENHANCED KAVA EXTRACT, METHOD OF MAKING THE SAME, AND COMPOSITIONS THEREOF, and U.S. patent application Ser. No. 16/020,875, filed Jun. 27, 2018, entitled CONCENTRATE AND PRODUCTS CONTAINING KAVA, AND METHODS OF MAKING THE SAME. All patents and patent publications referred to in the present application are incorporated herein in their entirety.

FIELD OF INVENTION

This invention relates to the process of making kava juices and other kava products more stable with long shelf life, and products made according to the process. The invention is more particularly concerned with a process involving ultra-high temperature, pasteurization, pascalization or combination techniques together for treating kava juices and other kava products suitable for extended shelf life and stability, and products made according to the process.

BACKGROUND

Kava (*Piper methysticum*) is a tropical shrub and belongs to the family piperaceae that grows commonly throughout the islands of South Pacific. This shrub is also grown in countries including Fiji, Vanuatu, USA, Samoa and Tonga. It is also referred to as intoxicating pepper. Kava and its products have been used in traditional medicine and for cultural purposes across Oceania for possibly as long as 30 centuries.

U.S. Pat. No. 5,770,207 A discloses a dietary supplement having kava root extract and at least one additional relaxing herb selected from the group consisting of Passion Flower, Chamomile Flowers. Hops, and Schizandra Fruit.

U.S. Pat. No. 5,976,550 A discloses a composition of matter to achieve a fat reducing effect comprising: a sugar based confectionary to be eaten before a meal to minimize the appetite, a therapeutic amount of chitosan mixed m the confectionary together with a therapeutic amount of kava whereby the chitosan functions to attract fat to form a non-digestible amalgam of chitosan and fat that passes out of the body and whereby the kava functions to reduce a desire to eat by mildly anesthetizing the mouth.

U.S. Pat. No. 9,636,373 B1 discloses to a kava-based beverage composition. In one embodiment, a beverage composition includes water; kava extracts, milk thistle extract and yerba mate extract.

U.S. Pat. No. 8,383,169 B1 discloses a composition comprises kava root extract and at least one additional component of lemon balm or chamomile extract to serves as a relaxant and mind energizer that affords the benefit of reduction in the incidence or severity of stomach upset and/or hangover.

U.S. Pat. No. 4,921,717 discloses a process of ultra-high temperature (UHT) process for making a sterilized milk product. This method involves a process in which milk or a milk product is partially concentrated, sterilized by UHT treatment and further concentrated to provide a sterile, concentrated material for aseptic packaging.

U.S. Pat. No. 3,364,038 discloses a process and apparatus for pasteurizing and clarifying, separating and homogenizing milk. The disclosure includes flexibility of processing control and product delivery and technique employed is compatible with standard high-temperature, short-time pasteurizing systems and increase in shelf-life for processed milk or cream.

U.S. Publication No. US 20080050507 A1 discloses a process for high-pressure processing (HPP) of foods for effective reduction of microbes such as *E. Coli, listeria* and *salmonella*. This HPP technique also referred to as pascalization or bridgmanization or high hydrostatic pressure (HHP) which uses isostatic pressure to evenly apply great pressures to food on all sides of the foods. The high-pressure intensely diminishes pathogens in the food so processed, as much as a four or five-log reduction in counts of colony forming units (CFU). This technique of usage of pressure is possible in a normal environment for varied products. In this method, food does not undergo deformation and a combination of food such as beef jerky or sausage with cheese to produce a product which is expected to have a long shelf life.

All the methods described above involve exclusive treating of animal products and not the plant products. This is because of difference in properties of animal and plant products. Kava juice and kava products are prepared from the roots, rhizomes and stems of the kava plant. The persistent color in kava juice and kava products is an indication of its texture, flavor, aroma and high quality. The precipitation of pectins leads to muddiness or turbid formation is accountable for the properties of the kava juice and other kava products. Kavalactones are measured to be the key ingredients of kava juices and other kava products and responsible for the pharmacological activity in humans such as anti-inflammatory, anxioly tic, sedative and analgesic effects. Eighteen kavalactones have been identified out of which six are mainly important namely kavain (1.8%), methysticin (1.2%), desmethoxyyangoninn (1%), yangonin (1%), dihydrokavain (0.6%) and dihydromethysticin (0.5%) in kava juices and other kava products. The standard of quality can be measured by the presence of total number of kavalactones in kava juice and other kava products. A qualitative form called chemotype which is commonly stated by the comparative concentration of each of the 6 major kavalactones in samples signifying a chemical profile of kava juices and other kava products.

The technique of pasteurization is utilized for killing pathogens and spoilage of microbes in dairy products such as milk. This procedure can also be implemented for destroying microbes in fruit juices and plant products. The complex and sensitive nature of kavalactones is a great concern when pasteurizing kava juices and other kava products so that the properties such as psychoactive features and taste of kava juices and other kava products are unaltered. This is because of the fact that pasteurizing procedure may terminate the physiochemical, organoleptic and nutritional features of kava juices and other kava products.

The kava juices and other kava products are made of highly temperature sensitive kavalactones and starch components and pasteurization of kava juices and other kava products may lead to degradation at temperatures above 60° C. On the other hand, natural, traditional and unpasteurized kava juices and other kava products approximately possesses a shelf life period of less than three days under refrigeration at 4° C. which is commercially unacceptable.

The embodiments relate to a combinatorial method for processing and preserving kava product and process of making it stable and commercially acceptable.

SUMMARY OF THE INVENTION

An embodiment relates to a method comprising heating a kava product, pressurizing the kava product, electrically pulsing the kava product or combinations thereof, homogenizing the kava product; cooling the kava product, and packaging of the kava product; wherein the method is configured to stabilize the kava product against microbiological decomposition.

Another embodiment related to further adding a processing aid to the kava product at any stage of the method.

In one embodiment, the processing aid comprises a substance used in a production of a processed food.

In one embodiment, the processing aid comprises an enzyme.

In one embodiment, the kava product comprises one or more of: a kava juice or a kava root water extract, a raw kava product frozen; a raw kava product at room temperature; a kava juice or a kava root water extract in beverages, aerated beverages, candies, hard and chewable gummy candies, confectionaries, and effervescent powder or tablet and dietary supplement; wherein the kava product contains two or more of kavain, methysticin, desmethoxyyangoninn, yangonin, dihydrokavain and dihydromethysticin.

In one embodiment, the heating of the kava product comprises exposing the kava product to a pasteurization temperature of 65° C. or more.

In one embodiment, the pressurizing the kava product comprises exposing the kava product to a pressure of about 200 MPa to about 1000 MPa.

In one embodiment, the electrically pulsing the kava product comprises exposing the kava product to a pulsed electrical field comprising positive and negative pulses.

In one embodiment, the homogenizing the kava product comprises homogenizing the kava product.

In one embodiment, the cooling the kava product comprises causing the kava product to cool after the heating and the pressurizing of the kava product.

In one embodiment, the packaging the kava product comprises an aseptic packaging.

Another embodiment relates to a method comprising heating a kava product to a pasteurization or sterilization temperature; homogenizing the kava product; cooling the kava product; and packaging the kava product; wherein the method is configured to stabilize the kava product against microbiological decomposition and prepare a shelf-stable kava product; wherein the kava product comprises:
a kava juice or a kava root water extract;
a kava juice or a kava root water extract in beverages, aerated beverages, candies, hard and chewable gummy candies, confectionaries, and effervescent powder or tablet and dietary supplement;
wherein the kava product contains two or more of kavamin, methysticin, desmethoxyyangoninn, yangonin, dihydrokavain and dihydromethysticin.

In one embodiment, the heating the kava product to the pasteurization temperature comprises exposing the kava product to a temperature of 65° C. or more for a period of 0.1 second or more.

In one embodiment, treatment of the kava product to achieve shelf stability comprises exposing the kava product to ionizing radiation.

In one embodiment, the packaging the kava product comprises aseptic packaging of the kava product.

Another embodiment relates to a method comprising heating a kava product; drying the kava product, pressurizing the kava product to a specific pressure optionally with heating; homogenizing the kava product optionally with heating: cooling the kava product, and packaging the kava product; wherein the method is configured to stabilize the kava product against microbiological decomposition and prepare a shelf-stable kava product; wherein the kava product comprises:
a kava juice or a kava root water extract;
a kava juice or a kava root water extract in beverages, aerated beverages, candies, hard and chewable gummy candies, confectionaries, and effervescent powder or tablet and dietary supplement;
wherein the kava product contains two or more of kavain, methysticin, desmethoxyyangoninn, yangonin, dihydrokavain and dihydromethysticin.

In one embodiment, the pressurizing the kava product comprises exposing the kava product to a pressure of 200 MPa or more.

In one embodiment, the cooling the kava product comprises exposing the kava product to a flash cooling.

BRIEF DESCRIPTION OF THE FIGURES

FIG. 1 depicts a viscoelasticity temperature sweep plot for understanding the microstructure of the kava product connected to the organization of the molecules.

FIG. 2 depicts a particle size distribution plot for the calculation of surface weighted mean and volume weighted mean.

DETAILED DESCRIPTION OF THE INVENTION

While this specification concludes with claims particularly pointing out and distinctly claiming that, which is regarded as the invention, it is anticipated that the invention can be more readily understood through reading the following detailed description of the invention and study of the included examples.

Definitions

KAVA PRODUCT: a consumable product containing an ingredient derived from a kava plant.

PROCESSING: producing a kava product from an ingredient derived from a kava plant utilizing the steps described in one or more of claims.

KAVA EXTRACT: a consumable product derived or obtained from a kava plant.

METHOD: a planned way of doing something: an order or system; an orderly or systematic arrangement, sequence or the like.

CONFIGURED TO STABILIZE THE KAVA PRODUCT AGAINST MICROBIAL DECOMPOSITION: reducing the microbial count to no more than $10^7$ cfu/g for a shelf life no less than 4 days under refrigeration temperatures. In some embodiments, a product as disclosed herein is stable for at least 2 weeks at refrigeration temperatures or at ambient temperatures. In an embodiment, the refrigeration temperatures could range from about 0° C. to about 10° C., or any value therebetween, such as 0° C., 1° C., 2° C., 3° C., 4° C. 5° C. 6° C., 7° C., 8° C. 9° C. or 10° C. In alternative embodiments, a beverage as disclosed herein has a shelf life for at least 3 months at ambient temperatures such as temperatures ranging from about 20° C. to about 30° C., or any value therebetween, such as 20° C. 21° C. 22° C. 23° C., 24° C., 25° C. 26° C., 27° C., 28° C., 29° C., or 30° C.

MICROBIAL COUNT: a microbial count, which also referred to as a colony-forming unit (CFU, cfu, Cfu) in microbiology, is a unit used to estimate the number of viable bacteria or fungal cells in a sample. Viable is defined as the ability to multiply via binary fission under the controlled conditions. Counting with colony-forming units requires culturing the microbes and counts only viable cells, in contrast with microscopic examination which counts all cells, living or dead. The visual appearance of a colony in a cell culture requires significant growth, and when counting colonies, it is uncertain if the colony arose from one cell or a group of cells. Expressing results as colony-forming units reflects this uncertainty.

SHELF LIFE: a shelf life of a kava product is period during which the kava product will not undergo significant physico-chemical, microbiological or sensory changes. An unstable product will have a short shelf life, whereas a stable product will have a long shelf life.

ASEPTIC: the Food and Drug Administration ("FDA") approved level of aseptic.

HOMOGENIZING: the intimate mixing of at least two components to form the Kava product or an intermediate used for making the Kava product.

PRESSURE: force per unit area.

PERIOD: to the interval of time.

CONFIGURED TO: capable of or suitable for.

STABILIZE: to hold steady so as to limit fluctuations.

STAGE: step.

SUBSTANCE: physical material from which something is made or which has discrete existence.

ONE OR MORE: not only one.

POWDER: a loose grouping or aggregation of particulate matter or solid particles, preferably smaller than 1000 micrometers.

TABLET: a small mass of containing a Kava product.

PULSED: intermittent rather than constant.

FIELD: a region or space in which a given effect (such as electricity or magnetism) exists.

NEGATIVE: less than.

COOL: removing heat.

STERILIZATION: a method of treating microorganisms so that the probability of survival of spores can be less than $1 \times 10^{-6}$.

OPTIONALLY: left to choice, not mandatory.

In one embodiment, the kava product is obtained or derived from selected parts of the kava plants that include stems, roots, and rhizomes. In another embodiment, the kava product is obtained or derived from selected parts of the kava plants that include and/or dried roots, and/or dried rhizomes, peeled, and/or dried rhizomes, and/or basal stems.

In another embodiment, the kava product is obtained or derived mainly from the roots of the kava plant, but the source of the kava product is not restricted only from the roots and can also be harvested from other parts of the kava plants. In another embodiment, kava product is obtained or derived from or prepared using lower part of the basal stem, rhizomes and/or roots to make kava comprising compositions. In another embodiment, kava product is obtained or derived from or prepared using lower part of the basal stem, rhizomes and/or roots to make kava comprising compositions including beverages, aerated beverages, candies, and confectionaries. In another embodiment, kava product is obtained or derived from or prepared using of intact roots, rhizomes, chips or powdered forms to make dried kava comprising compositions. In another embodiment, dried kava comprising compositions may be in the form of intact roots, rhizomes, chips or powdered forms All part of kava plants contain water, starch, dietary fibers, sugar, proteins, minerals and kavalactones. Kava plants contain water, different types of starches, different types of dietary fibers, different types of sugar, different types of proteins, different types of minerals and kavalactones. The kava plants are harvested after they have matured in order for them to contain higher amounts of kavalactone or high kavalactone content. Kavalactones provide the pharmacological activities that allows the kava product to produce or induce a state of calmness, relaxation and well-being without diminishing cognitive performance or causing negative side effects.

Generally, the roots, rhizomes and/or lower part of the basal stem of the harvested mature kava plants contain higher amounts of kavalactone or high kavalactone content and are the preferred part of the plant that is used as a source for making kava product for the purpose of the embodiments described herein. In one embodiment, the kava plants are harvested after they have matured so they can be used as a source to obtain higher concentration of kavalactone content in the kava product. In another embodiment, the kava plants are harvested after they have matured so they can be used as a source to obtain higher amounts of kavalactone content. In another embodiment, the kava plants are harvested after they have matured so they can be used as a source to obtain more favorable compositional mix of kavalactone in the kava product. In one embodiment, the kava product of the embodiment, the kava plants are usually harvested after a minimum time of 2 years, so they can be used as a source to obtain higher amounts of kavalactone content or higher concentration of kavalactone content or favorable compositional mix of kavalactone in the kava product. In another embodiment, the kava product of the embodiment, the kava plants are usually harvested after a minimum time of 3 years, so they can be used as a source to obtain higher amounts of kavalactone content or higher concentration of kavalactone content or more favorable compositional mix of kavalactone in the kava product. Preferably a minimum of 3 to 4 years or 5 years is desired before the plants are harvested so they can be used as a source to obtain higher amounts of kavalactone content or higher concentration of kavalactone content or favorable compositional mix of kavalactone in the kava product.

In one embodiment, kavalactones are main source or the principal ingredients for serving as a relaxant, providing relief from anxiety, providing calming benefits, providing relief from nausea producing a state of calmness, relaxation and well-being without diminishing cognitive performance. There are different types of kavalactones present in the kava plant. Six of these kavalactones make up greater than 90 and in some cases 95% of the total kavalactones pharmacological activity. The six major kavalactones are kavain, dihydrokavain, methysticin, dihydromethysticin, yangonin, and desmethoxyyangonin.

In one embodiment, untreated Kava root water extract was subjected to microbiological testing. This gives a clear picture for understanding the changes in stability and extended shelf life of treated kava products, keeping in mind untreated products are less stable than treated products. This less stable nature is due to presence of microorganisms in kava juices or kava products. In the case of unicellular microorganisms like bacteria, the entire organism is reproduced by the reproduction of the cell. Consequently, microbial growth is fundamentally identical with microbial reproduction. It is important to determine the number of bacteria i.e., enumeration of microorganisms such as bacteria to understand the rates of microbial growth and death. It is essential to determine the number of microorganisms such as bacteria in a given kava product. For example, the ability to determine the safety of kava products depends on knowing the levels of microorganisms such as bacteria in those products. The most common procedure for the enumeration of bacteria in a sample such as kava product is the viable plate count. In this method, successive dilutions of a kava product containing viable microorganisms are plated onto an appropriate growth medium. The suspension is either dispersed on the surface of agar plates referred to as spread plate method or the suspension is mixed with molten agar followed by pouring in plates, and allowed to solidify referred to as pour plate method. The plates are then incubated under conditions that allow microbial reproduction so that colonies develop that can be seen without the assistance of a microscope. It is assumed that each bacterial colony arises from distinct cell that has undergone cell division. Therefore, by counting the number of colonies and accounting for the dilution factor, the number of bacteria in the original kava product can be determined. The viable count is an approximation of the number of cells. Because some organisms exist as pairs or assemblies and because mixing and shaking of the kava sample does not constantly separate all the cells, we really get a count of the colony forming units (CFU). Unicell or assembly of cells will yield one colony, therefore recording results for a viable count, it is routine to record the results as colony forming units per ml (cfu/ml) or per gram (cfu/g) of test material. In one embodiment, enumeration of aerobic bacteria was performed at 35° C. and aerobic plate count was found to be $8.40 \times 0^6$ cfu/g. In another embodiment, enumeration of aerobic bacteria was performed at 35° C. using PCA Agar-P and aerobic plate count was found to be E[NZ]<100>25 000 000/g (2-5).

An embodiment relates to techniques utilizing a treatment such as ultra-high temperature (UHT) pasteurization and/or sterilization, optionally with microwave volumetric heating (MVT), pascalization [also referred to as bridgmanization or high-pressure processing (HPP) or high hydrostatic pressure (HHP)] for processing and preserving kava product and process of making it stable. An embodiment relates to a sterilized or similarly treated kava (*piper methysticum*) product and a new process for producing shelf stable or extended shelf life kava juices and other kava products.

An embodiment provides a method for treating kava to reduce the microbial count and ensure safety of the resulting product involving ultra-high temperature (UHT) pasteurization and/or sterilization, wherein temperature range comprising 135° C. (275° F.)-190° C. (375° F.), wherein cooling is with or without flash, wherein treatment process involving is with or without homogenization, wherein treatment process involving is with or without the use of processing aids or enzymes, and wherein treatment process involving is with or without packaging of the kava product for making it stable.

A processing aid is a substance used in the production of processed food, and which may end up in the finished product, but which is not, by law, required to be disclosed to the consumer as an ingredient. Under the United Kingdom food labelling regulations, a "processing aid" is defined as follows: "Processing aid means any substances not consumed as a food by itself, intentionally used in the processing of raw materials, foods or their ingredients, to fulfil a certain technological purpose during treatment or processing, and which may result in the unintentional but technically unavoidable presence of residues of the substance or its derivatives in the final product, provided that these residues do not present any health risk and do not have any technological effect on the finished product."

Under the law of the United States of America, a substance is legally a "processing aid" and can be excluded from ingredients labels if it meets any of the following criteria:
1. It is added to the food but later removed. E.g. activated charcoal, which removes certain impurities.
2. It is added to the food, but gets converted into a substance already present in the food. E.g. a pH adjuster that converts to salt and does not significantly add to the food's salt level.
3. It is added for a technical effect during processing but is not present at "significant" levels in the food. E.g. a preservative added to an ingredient, like anti-caking agent sodium silicoaluminate in the seasoning of some sausages.

An embodiment provides a process for treating kava product to reduce the microbial count and ensure safety of the resulting kava product wherein treatment process involves microwave pasteurization and/or sterilization using microwave volumetric heating (MVH) of the kava product for making it stable.

An embodiment provides a process for treating kava product to reduce the microbial count and ensure safety of the resulting kava product wherein treatment process involves the general technique known by either of the names such as pascalization or bridgmanization or high-pressure processing (HPP) or high hydrostatic pressure (HHP) of the kava product for making it stable.

An embodiment provides a process for treating kava product to reduce the microbial count and ensure safety of the resulting kava product involving traditional pasteurization known as high temperature short time (HTST) wherein temperature range comprising 65° C. (149° F.)-190° C. (375° F.), wherein cooling is with or without flash, wherein treatment process involving is with or without homogenization and wherein treating process is with or without packaging of the kava product for making it stable.

An embodiment provides a process for treating kava product to reduce the microbial count and ensure safety of the resulting kava product wherein treatment process involves pulsed electric field (PEF) of the kava product for making it stable.

An embodiment provides a process for treating kava product to reduce the microbial count and ensure safety of the resulting kava product wherein treatment process involves non-ionizing radiation sterilization of the kava product for making it stable.

An embodiment provides a process for treating kava product to reduce the microbial count and ensure safety of the resulting kava product wherein treatment process involves ionizing radiation sterilization of the kava product for making it stable.

Ultra-high temperature (UHT) method of treatment of the kava product. i.e. UHT pasteurization, involves heating the liquid kava product continuously, and ensuring that each particle of the kava product has been held at the predetermined ultra-high temperature for a lowest extent of time. The UHT technique can be unified into a sterilization technique, in which the kava product is heated to a temperature of 275° F.-375° F. or above, and is held for a consistent holding time to ensure that the microorganisms and their spores in the kava product are destroyed. Then the sterilized kava product is packed aseptically and aseptically sealed. The purpose here is to allow the liquid kava product to be stored at room temperature indefinitely without spoilage due to action of microorganisms. However, the method of ultra-high pasteurization processing may modify the flavor or necessary color or texture of the kava product and may result in a heated or burnt flavor in the kava product. The UHT treated kava product is then subjected for microbiological test in the embodiment. In one embodiment, the analysis of the UHT treated kava product sample is carried out at 31° C. In one embodiment, enumeration of yeasts and molds is performed at 35° C. and plate count is found to be <10 cfu/g. In another embodiment, enumeration of aerobic bacteria was performed at 35° C. using PCA Agar-P and aerobic plate count is found to be E[NZ]<100>25 000 000/g (2-3). In one embodiment, enumeration of yeasts and molds were performed at 35° C. using Agar-P and aerobic plate count is found to be E[NZ]<10>15 000/g (1-2).

Microwave volumetric heating (MVH) treatment of kava juice or kava product is conducted in the embodiment for microbial degradation. The competence for rapid volumetric heating using strong but relatively low-cost equipment can offer initial standards for simple microwave heated reaction vessels Microwave accelerated heating for pasteurizing the biological products have been the subject of rigorous research and development activity but typically at a very small scale and volume levels confined only to a bench top scale. An embodiment provides the application of microwave heating treatment for pasteurization of kava juice or kava product. It enables the volumetric heating of the kava juice or kava product preceding or concurrently with the treatment processing. A rapid heating is accomplished during this microwave volumetric heating treatment which destroys the microorganisms present in kava juice or kava product. In some embodiment, the application of microwave volumetric heating at range 460 MHz to 2450 MHz is accomplished to destroy the microorganisms present in kava juice or kava product. This microwave volumetric heating for pasteurization of the kava juice or kava product is performed under controlled conditions using pressurized vessels such as steel vessels employed in continuously stirred reactors in the embodiment. In one embodiment, low frequency of 460 MHz by microwave volumetric heating is accomplished to destroy the microbes in kava juice or kava product. In another embodiment, frequency of 915 MHz used in industrial conditions by microwave volumetric heating is accomplished to destroy the microbes in kava juice or kava product. In one embodiment, frequency of 2450 MHz used in domestic conditions by microwave volumetric heating is accomplished to destroy the microbes in kava juice or kava product.

Viscoelastic measurements are suitable tools for finding evidence about the microstructure of the kava product connected to the organization of the molecules in the kava product. The presence of a broad dispersion in kava product can be represented by the viscoelasticity temperature sweep plot derived from experimental values of the dynamic moduli namely G' (storage modulus) and G" (loss modulus). The measurements of parameters such as temperature, frequency, angle (delta), storage modulus (G') and loss modulus (G") with varied timings is shown in Table 1.

TABLE 1

Parameters for measuring Viscoelasticity of gel like kava product

| S. No. | Time (min) | Temperature (° C.) | Frequency (Hz) | Delta (degrees) | G' (Pa) | G" (Pa) |
|---|---|---|---|---|---|---|
| 1 | 0.1 | 30.2 | 1 | 95.73 | −0.01314 | 0.131 |
| 2 | 1 | 30.9 | 1 | 147.4 | −0.04606 | 0.02944 |
| 3 | 2 | 32 | 1 | 135.7 | −0.05828 | 0.05693 |
| 4 | 3 | 33 | 1 | 173.6 | −0.04603 | 5.13E−03 |
| 5 | 3.9 | 33.9 | 1 | 149.1 | −0.04593 | 0.02748 |
| 6 | 5 | 35 | 1 | 163 | −0.0375 | 0.01149 |
| 7 | 5.9 | 35.9 | 1 | 175.4 | −0.04584 | 3.71E−03 |
| 8 | 7 | 37 | 1 | 93.2 | −2.88E−03 | 0.05149 |
| 9 | 7.9 | 37.9 | 1 | 152.8 | −0.02767 | 0.01421 |
| 10 | 9 | 39 | 1 | 118.8 | −0.0104 | 0.0189 |
| 11 | 9.9 | 39.9 | 1 | 145.4 | −0.04667 | 0.0322 |
| 12 | 11 | 41 | 1 | 125.6 | −0.02737 | 0.03824 |
| 13 | 11.9 | 41.9 | 1 | 127 | −0.01777 | 0.0236 |
| 14 | 13 | 42.9 | 1 | 122.2 | −0.01737 | 0.02761 |
| 15 | 13.9 | 43.9 | 1 | 155.3 | −0.02857 | 0.01315 |
| 16 | 15 | 45 | 1 | 172.7 | −0.06386 | 8.19E−03 |
| 17 | 15.9 | 45.9 | 1 | 100.4 | −4.01E−03 | 0.02189 |
| 18 | 17 | 47 | 1 | 93.78 | −1.02E−03 | 0.01551 |
| 19 | 17.9 | 47.9 | 1 | 84.01 | 3.28E−03 | 0.03126 |
| 20 | 19 | 49 | 1 | 69.37 | 0.01288 | 0.03421 |
| 21 | 20 | 49.9 | 1 | 66.46 | 0.01354 | 0.03108 |
| 22 | 21 | 51 | 1 | 53.14 | 0.02177 | 0.02904 |
| 23 | 22 | 52 | 1 | 57.36 | 0.01993 | 0.03111 |
| 24 | 22.9 | 52.9 | 1 | 36.44 | 0.03419 | 0.02524 |
| 25 | 24 | 54 | 1 | 18.17 | 0.02992 | 9.82E−03 |
| 26 | 24.9 | 54.9 | 1 | 61.87 | 0.03167 | 0.05925 |
| 27 | 26 | 56 | 1 | 32.21 | 0.04995 | 0.03146 |
| 28 | 26.9 | 56.9 | 1 | 23.51 | 0.06635 | 0.02887 |
| 29 | 28 | 58 | 1 | 45.25 | 0.05008 | 0.05051 |
| 30 | 28.9 | 58.9 | 1 | 18.37 | 0.08916 | 0.02961 |
| 31 | 30 | 60 | 1 | 21.5 | 0.08829 | 0.03477 |
| 32 | 30.9 | 61 | 1 | 31.3 | 0.0917 | 0.05575 |
| 33 | 32 | 62 | 1 | 21.58 | 0.119 | 0.04706 |
| 34 | 32.9 | 62.9 | 1 | 5.142 | 0.1502 | 0.01352 |
| 35 | 34 | 64 | 1 | 17.52 | 0.199 | 0.0628 |
| 36 | 34.9 | 64.9 | 1 | 11.44 | 0.2497 | 0.05053 |

TABLE 1-continued

Parameters for measuring Viscoelasticity of gel like kava product

| S. No. | Time (min) | Temperature (° C.) | Frequency (Hz) | Delta (degrees) | G' (Pa) | G" (Pa) |
| --- | --- | --- | --- | --- | --- | --- |
| 37 | 36 | 66 | 1 | 16.67 | 0.3186 | 0.09541 |
| 38 | 36.9 | 66.9 | 1 | 15.97 | 0.6129 | 0.1754 |
| 39 | 38 | 67.9 | 1 | 16.53 | 1.724 | 0.5118 |
| 40 | 38.9 | 69 | 1 | 16.28 | 6.044 | 1.765 |
| 41 | 40 | 70 | 1 | 13.1 | 16.26 | 3.785 |
| 42 | 40.9 | 70.9 | 1 | 10.54 | 29.48 | 5.484 |
| 43 | 42 | 72 | 1 | 9.182 | 46.69 | 7.548 |
| 44 | 42.9 | 73 | 1 | 8.668 | 63.07 | 9.615 |
| 45 | 44 | 74 | 1 | 8.371 | 82.09 | 12.08 |
| 46 | 44.9 | 74.9 | 1 | 7.915 | 100.1 | 13.92 |
| 47 | 46 | 76 | 1 | 8.177 | 119.6 | 17.19 |
| 48 | 46.9 | 76.9 | 1 | 8.083 | 137.5 | 19.53 |
| 49 | 48 | 78 | 1 | 8.252 | 157 | 22.77 |
| 50 | 48.9 | 78.9 | 1 | 8.527 | 173.7 | 26.04 |
| 51 | 50 | 79.9 | 1 | 8.51 | 191.8 | 28.69 |
| 52 | 50.9 | 80.9 | 1 | 9.149 | 204.9 | 33 |
| 53 | 52 | 82 | 1 | 9.464 | 220 | 36.67 |
| 54 | 52.9 | 83 | 1 | 10.29 | 231.2 | 41.97 |
| 55 | 54 | 84 | 1 | 10.82 | 242 | 46.25 |
| 56 | 54.9 | 84.9 | 1 | 10.92 | 253.5 | 48.92 |
| 57 | 56 | 86 | 1 | 11.67 | 261.9 | 54.1 |
| 58 | 57 | 87 | 1 | 12.44 | 267.1 | 58.94 |
| 59 | 58 | 88 | 1 | 13.21 | 271.6 | 63.74 |
| 60 | 59 | 89 | 1 | 13.99 | 272.5 | 67.92 |
| 61 | 60 | 90 | 1 | 14.82 | 272.3 | 72.03 |
| 62 | 60.9 | 91 | 1 | 15.69 | 268.3 | 75.35 |
| 63 | 62 | 92 | 1 | 16.65 | 262.9 | 78.59 |
| 64 | 63 | 92.9 | 1 | 17.02 | 260.8 | 79.83 |
| 65 | 64 | 94 | 1 | 18.35 | 250.4 | 83.05 |
| 66 | 65 | 95 | 1 | 19.73 | 238.9 | 85.7 |

The objective is to determine the viscoelastic behavior of a gel like treated kava product by plotting G' (storage modulus) and G" (loss modulus) measured in Pascal (Pa) units versus temperature measured in Celsius (° C.) units. The plot thus obtained called as viscoelasticity temperature sweep plot is shown in FIG. 1. From the plot, it is clear that when temperature reaches 69° C. a drastic increase in storage modulus G' and loss modulus G" can be observed from FIG. 1. From 70 C onwards there is a steady increase in G' up to 89 C can be noticed from the plot shown in FIG. 1. Once the temperature reaches 90 C the value of G" starts decreasing and continues to decrease gradually up to 95° C. can be seen from the plot shown in FIG. 1 but to a less extent. This indicates that the viscosity of the gel like kava product is high below 69° C. and started to decrease with increase in temperature. At low temperature, in kava product, due to high viscosity molecules are very close to each other and molecular collisions are less. When the temperature increases, molecules will be activated and involves in collisions to a greater extent. This is because rate of molecular collisions increases with increase in temperature. This decreases the viscosity of the gel like kava product. For storage modulus (G'), this decrease in viscosity extends up to 89° C. After 89° C. the viscosity again slightly increases up to 95° C. but to a less extent. On the other hand, after 70° C. there is a steady increase in loss modulus (G") can be seen up to 95° C. from FIG. 1. This observation also shows that viscosity is high below 69° C. and gradually increases up to 95° C. In one of the embodiments, the viscosity of the gel like kava product is high at lower temperature preferably below 69° C. In another embodiment, the viscosity of the gel like kava product is low at higher temperature preferably above 69° C. In one of the embodiments, the storage modulus G' of the gel like kava product is low at lower temperature preferably below 69° C. In one of the embodiments, the storage modulus G' of the gel like kava product is high at higher temperature preferably above 69° C. In one of the embodiments, the storage modulus G' of the gel like kava product is low at higher temperature preferably above 90° C. In one of the embodiments, the loss modulus G" of the gel like kava product is low at lower temperature preferably below 69° C. In one of the embodiments, the storage modulus G' of the gel like kava product is high at higher temperature preferably above 69° C.

Measurement of particle size of kava product and understanding how it affects the products and processes were analyzed in the embodiment. This analysis is carried out because of its importance in understanding the physical property of particulate samples related to particle size of the kava product. Particle size measurement is a critical parameter in the preparation of kava products. Various properties of kava products such as reactivity, stability, efficacy, texture, appearance, flowability, viscosity, packing density and porosity, were influenced by particle size of the kava product. The essential parameters such as volume and particle size of the treated kava product is shown in Table 2. Static light scattering procedures like laser diffraction will give a volume weighted distribution. Here the influence of each particle of the kava Juice and other kava products in the distribution relates to the volume of that particle in the kava juice or kava product which is equivalent to mass if the density is uniform as well as relative contribution will be proportional to cube of the particle size [(size)$^3$] of the kava juice or kava products. This is really useful from a commercial viewpoint as the distribution signifies the composition of the kava juice and other kava products in terms of its volume or mass, and consequently its potential worth. Various values of volume and particle size of the kava juice sample were plotted against each other to form a particle size distribution plot as shown in FIG. 2. This is an example of normal distribution curve. The volume moment mean, also referred to as De Brouckere Mean Diameter, which is applicable for kava juice and other kava food samples as it mirrors the size of those particles which constitute the bulk of the sample volume. It is more sensitive to the existence of large particulates in determining the size distribution. It is very clear from Table 2 that when the particle size is 1.233 μm the volume of the kava juice sample is 0.13%. This gradually increases and pass through a maximum when particle size is 12.328 μm corresponding to volume 11.39%. Further increase in particle size gradually decreases the volume of the kava juice sample as shown in distribution curve which starts from 10.90% corresponding to particle size 15.199 μm. This decrease in volume goes up to 1.91% for which size of the particle is 43.288 μm. Again, volume of the kava sample increases from 53.307 μm corresponding to 2.26% of volume. This increase in volume reaches a maximum value of 3.16% corresponding to particle size 123.285 μm. The volume drops once again from 2.26% for which particle size is 151.991 μm up to 0.14% corresponding to 811.131 μm. It can be noted from the FIG. 2 that below the particle size of 1.233 μm and above 811.131 μm, the kava sample has 0.00% volume. From the FIG. 2, it is clear that there are two maxima observed in the plot of volume in percent versus particle size. The surface area mean which is referred to as Sauter Mean Diameter is one of the most appropriate way where specific surface area is significant such as bioavailability, reactivity and dissolution for the kava juice sample in the embodiment. It is also most sensitive to the existence of fine particulates in the size distribution of the kava juice or kava product. In one of the embodiments, kava juice examined as average sample with particle size ranging from 0.020 to 2000.0 μm is analyzed in which weighted residual is 0.689% and concentration of the kava juice is 0.0174% with specific surface area of 0.57 m$^2$/g and surface weighted mean D[3,2] is observed at an average of particle size 11.380 μm. In another embodiment, kava juice examined as average sample with particle size ranging from 0.020 to 2000.0 μm is analyzed in which weighted residual is 0.689% and concentration of the kava juice is 0.0174% and volume weighted mean D[4,3] is observed at an average of particle size 31.962 μm.

TABLE 2

Parameters for the Particle Size Distribution Plot

| S. No. | Size (μm) | Volume in % |
|---|---|---|
| 1 | 0.010 | 0.00 |
| 2 | 0.012 | 0.00 |
| 3 | 0.015 | 0.00 |
| 4 | 0.019 | 0.00 |
| 5 | 0.023 | 0.00 |
| 6 | 0.028 | 0.00 |
| 7 | 0.035 | 0.00 |
| 8 | 0.043 | 0.00 |
| 9 | 0.053 | 0.00 |
| 10 | 0.066 | 0.00 |
| 11 | 0.081 | 0.00 |
| 12 | 0.100 | 0.00 |
| 13 | 0.123 | 0.00 |
| 14 | 0.152 | 0.00 |
| 15 | 0.187 | 0.00 |
| 16 | 0.231 | 0.00 |
| 17 | 0.285 | 0.00 |
| 18 | 0.351 | 0.00 |
| 19 | 0.433 | 0.00 |
| 20 | 0.534 | 0.00 |
| 21 | 0.658 | 0.00 |
| 22 | 0.811 | 0.00 |
| 23 | 1.000 | 0.00 |
| 24 | 1.233 | 0.13 |
| 25 | 1.520 | 0.23 |
| 26 | 1.874 | 0.24 |
| 27 | 2.310 | 0.22 |
| 28 | 2.848 | 0.34 |
| 29 | 3.511 | 0.85 |
| 30 | 4.329 | 1.99 |
| 31 | 5.337 | 3.79 |
| 32 | 6.579 | 6.08 |
| 33 | 8.111 | 8.51 |
| 34 | 10.000 | 10.48 |
| 35 | 12.328 | 11.39 |
| 36 | 15.199 | 10.90 |
| 37 | 18.738 | 9.11 |
| 38 | 23.101 | 6.57 |
| 39 | 28.480 | 4.13 |
| 40 | 35.112 | 2.47 |
| 41 | 43.288 | 1.91 |
| 42 | 53.367 | 2.26 |
| 43 | 65.793 | 3.02 |
| 44 | 81.113 | 3.62 |
| 45 | 100.000 | 3.69 |
| 46 | 123.285 | 3.16 |
| 47 | 151.991 | 2.25 |
| 48 | 187.382 | 1.31 |
| 49 | 231.013 | 0.61 |
| 50 | 284.804 | 0.25 |
| 51 | 351.119 | 0.16 |
| 52 | 432.876 | 0.20 |
| 53 | 533.670 | 0.14 |
| 54 | 657.933 | 0.00 |
| 55 | 811.131 | 0.14 |
| 56 | 1000.000 | 0.00 |
| 57 | 1232.847 | 0.00 |
| 58 | 1519.911 | 0.00 |
| 59 | 1873.817 | 0.00 |
| 60 | 2310.130 | 0.00 |
| 61 | 2848.036 | 0.00 |
| 62 | 3511.192 | 0.00 |
| 63 | 4328.761 | 0.00 |
| 64 | 5336.699 | 0.00 |
| 65 | 6579.332 | 0.00 |
| 66 | 8111.308 | 0.00 |
| 67 | 10000.000 | 0.00 |

In one embodiment, a technique for deactivating microbes of untreated kava juice or kava product using high-pressure processing (HPP) comprising the steps of: (i) heating of untreated kava juice or kava product to a pre-pressurized temperature, (ii) placing the kava juice or kava product in a pressure vessel, (iii) exposing the kava juice or kava product to a pressure at a pressurized temperature for a time period in the existence of a transmitting pressure fluid, (iv) decreasing the pressure in the vessel after the period of time and (v) removal of HPP treated kava juice or kava product from the pressure vessel. The steps (iii) and (iv) mentioned above may be repeated at least once before step (v) is accomplished. The time period and pressure being modifiable between repetitions of steps (iii) and (iv) mentioned in the process. This embodiment may further comprise an extra step before step (ii) of exposing the kava juice or kava product to a preset amount of oxygen for a period of time. The kava juice or kava product is heated to a pre-pressurized temperature using preferably a preheated oven. The pre-pressurized temperature is preferably 90° C. The drying is continued in the preheated oven until the moisture content of the individual particles or granules are concentrated to 11 to 13 percent by weight. Preferably water is used as the transmitting pressure fluid in the pressure vessel. The pressure in the pressure vessel is preferably between 400 MPa to 1000 MPa, and preferably able to be increased or decreased incrementally. The pressurized temperature is preferably 238° C. in this process. During the high-pressure processing (HPP), the pressure has an unvarying consequence on the total pre-packaged kava juice or kava product. The flexibility of the product container containing kava juice or kava product permits it to compensate for external pressure via a decrease in volume. Hence, flexible containers are desirable for high-pressure processing (HPP) of kava juice or kava product in the embodiment.

During the high-pressure processing (HPP), it is preferable to pre-pack the kava juice or kava product in a flexible container or pouch. Another variation of the HPP process would be to apply the HPP process to non-heated and even frozen product. (i.e., the ingredients do not necessarily need to be pre-heated).

In one embodiment, the HPP treated kava juice or kava product is checked for aerobic mesophilic plate count for the enumeration of bacteria in the embodiment. In another embodiment, the HPP treated kava juice or kava product is checked for enumeration of yeasts and molds in the embodiment. In one embodiment, the result of aerobic mesophilic plate count for the enumeration of bacteria of HPP treated kava product is found to be 8000 cfu/g for the HPP treated kava product measured at pressure of 450 MPa. In another embodiment, the result of aerobic mesophilic plate count for the enumeration of bacteria of HPP treated kava product is found to be 5500 cfu/g for the HPP treated kava product measured at pressure of 600 MPa. In one embodiment, the enumeration of yeasts is found to be <10 cfu/g for HPP treated kava at the pressure of 450 MPa. In another embodiment, the enumeration of yeasts m this analysis is found to be <10 cfu/g for HPP treated kava at the pressure of 600 MPa. In one embodiment, the enumeration of molds is found to be <10 cfu/g for HPP treated kava at the pressure of 450 MPa. In another embodiment, the enumeration of molds is found to be <10 cfu/g for HPP treated kava at the pressure of 600 MPa.

In one embodiment, a technique for deactivating infectious agents, like viruses and virus type agents, from fluids, like body fluids, such as blood plasma, is by using high temperature short time (HTST) of heat sensitive untreated kava juice or kava product is performed. In this HTST technique, speedy heating of the heat sensitive kava juice or kava product so as to effect heating, such as sterilization or pasteurization, without eradicating or markedly shifting the biological action, flavor or other necessary features of the heat sensitive kava juice or kava product. In this HTST technique, destroying of particular microorganisms in kava juice or kava product can be achieved. In one embodiment, kava juice is sterilized at a sterilization temperature of 134° C. (274° F.), or a pasteurization temperature at 65° C. (149° F.) to 134° C. (274° F.) by high temperature short time (HTST) method. In another embodiment, holding the heated kava juice at the temperature either sterilization or pasteurization for a selected holding time period of about 0.1 seconds is performed to affect the destruction of the desired microorganisms in the embodiment. In one embodiment, heated kava juice is allowed to rapid cooling, below 65° C. (149° F.) such as 5° C. (41° F.) to 25° C. (77° F.) in the HTST technique. In one embodiment. HTST treatment of kava juice or kava product involves cooling the kava juice or kava product with or without flash cooling in the embodiment. In another embodiment. HTST treatment of kava juice or kava product in which the process considered can be with or without homogenization of the kava juice or kava product. In one embodiment. HTST treatment of kava juice or kava product can be with or without aseptic packaging. In another embodiment. HTST treatment of kava juice or kava product involves circulation of heat sensitive kava juice or kava product during the heating, cooling and holding time periods.

An embodiment additionally offers a technique of bringing a pulsed electric field (PEF) in an untreated kava juice or untreated kava product in liquefied form for the deactivation of bacterial spores. The technique comprises the stages of pumping the untreated kava juice or untreated kava product in liquified form through a treating equipment so as to create a kava juice or kava liquid product movement in the treating equipment, creating a plurality of pulsed electric fields (PEFs), and bringing the plurality of pulsed electric fields in the kava juice or kava product in liquified form wherein the brought pulsed electric field (PEF) vector pathway is parallel to the movement of kava juice or kava product in liquified form. Moreover, the stage of creating a plurality of pulsed electric fields (PEFs) comprises the stage of creating a pulsed electric field (PEF) with a frequency range of 400 Hz to 20 kHz and an electric field range of 14 kV/cm to 160 kV/cm. Preferably 45 kV/cm field strength is employed for the treatment in the embodiment. The technique additionally comprises the stage of controlling the kava juice or kava product in liquified form temperature in the range of 35° C. to 40° C. or below 40° C. Moreover, the stage of creating a pulsed electric field (PEF) comprises a stage of creating a pulsed electric field with a pulse length of 1 to 20 micro seconds. Preferably 3 micro seconds is employed for the treatment of kava juice or kava product in the embodiment. The pulsed electric field (PEF) procedure uses an electric field voltage applied across two electrodes where a kava juice or kava food product in liquified form exists between the electrodes. Because kava juice or kava liquified products are principally comprising of kava lactones, water and nutrients, a consistent electric field is brought in the kava juice or kava product in liquified form. A bactericidal effect, generally called the dielectric rupture (based on Dielectric Rupture Theory), arises due to this transported electric field in the kava juice or kava product in liquified form. From the Dielectric Rupture Theory, it can be observed that pulsed electric field (PEF) treatment decreases the activity of bacteria and other microorganisms by destroying the bacterial or microorganism cell structure in kava juice or kava food product in liquified form. The applied electric field brings an electric potential across the membrane of a living cell present in bacteria or microorganisms present in kava juice or kava product in liquified form. This would create an electrostatic partition of charges in the cell membrane of the bacteria and microorganisms of kava juice or kava product in liquified form. This leads to pore establishment in weak zones of the cell membrane of bacteria or microorganisms in kava juice or kava product in liquified form. The pore establishment and destroying of cell membrane have a fatal consequence on the bacteria or microorganisms in kava juice or kava product in liquified form. It is expected that processing of kava juice in this PEF treatment would decrease the microbes considerably and enhance the shelf life of kava juice. In one embodiment, 45 kV/cm field strength having a pulse duration of 3 micro seconds was applied to effect 4 positive and 4 negative pulses per second of untreated kava juice. In another embodiment, this PEF treatment involves a total of 35 positive and 35 negative pulses. In one embodiment, the PEF treatment involves heating at 35° C. to 4° C. or below 40° C. during the processing of kava juice. In another embodiment, the cold-water circulation was maintained to control the temperature of the heating process and water circulation in this example is performed at 10° C. to 15° C. in the embodiment.

Microwave radiation as a source of non-ionizing electromagnetic radiation has been used in non-ionization radiation sterilization technique to heat kava juice or kava product for destroying microbes to afford extended shelf life in the embodiment, thus permitting essential preparation of kava products for distribution. It is expected that this non-ionization treatment using microwave irradiation would reduce microbes reasonably and extend the shelf life of kava juice or kava product. In one of the embodiments, a technique may comprise providing a closed container which comprises a free-flowing kava juice or kava product inclined within this container. Also, this technique involves conveying the closed container through a non-ionizing electromagnetic radiation apparatus during a conveying time period. The technique comprises transmitting microwave radiation from the non-ionizing electromagnetic radiation apparatus to the free-flowing kava juice or kava product to achieve a sterilization temperature during a transmitting time period. During the non-ionizing radiation sterilization treatment of kava juice or kava product, at least a portion of the transmitting time period overlaps with at least a portion of the conveying time period. The technique comprises manipulating the closed container during a manipulating time period to achieve sterilization of the entirety of the kava juice or kava product within the closed container and the whole of interior surfaces of the closed container. Again, during this process at least a portion of the manipulating time period overlaps with at least a portion of the transmitting time period. In one embodiment, the technique may comprise providing a closed container which comprises a free-flowing kava juice or kava product inclined within it. In another embodiment, the container comprises a base and the closed container is placed vertically upright on the container base, and the closed container is subjected to microwave radiation as the source of non-ionizing electromagnetic radiation adequate to attain sterilization temperature. In one embodiment, the technique may comprise exposing the closed container to an inversion sequence which comprises a first inversion of the container until the container base is located at an angle of up to about 180 degrees relative to vertical orientation. In another embodiment, the first inversion occurs over a time period of at least three seconds, and wherein the inversion sequence allows for sterilizing of interior surfaces of the container. In one of the embodiments, untreated kava juice is subjected to non-ionizing radiation sterilization treatment using microwave irradiation, after being placed in a bottle and the bottle capped. In another embodiment, the microwave irradiation was performed about 50 to 60 seconds and the raise in temperature of the come-up zone is about 78° C. to 80° C. of the system and the capped kava juice was maintained at a target temperature of about 78° C. to 80° C. for about 1 to 2 minutes. The bottle containing the kava juice or kava product were then allowed to cool at 25° C.

Irradiation by ionization radiation sterilization technique is used to reduce or eliminate the risk of food-borne illnesses, prevent or slow down spoilage, arrest maturation or sprouting and as a treatment against pests in the kava product. Depending on the dose, some or all of the pathogenic organisms, microorganisms, bacteria, and viruses present are destroyed, slowed down, or rendered incapable of reproduction. When targeting bacteria, most foods are irradiated to significantly reduce the number of active microbes, not to sterilize all microbes in the product. In this respect it is similar to pasteurization. Irradiation is used in this embodiment to create shelf-stable kava products. The radiation source supplies energetic particles or waves. As these waves/particles pass through the target material they collide with other particles. Around the sites of these collisions chemical bonds are broken, creating short lived radicals (e.g. the hydroxyl radical, the hydrogen atom and solvated electrons). These radicals cause further chemical changes by bonding with and or stripping particles from nearby molecules. When collisions damage DNA or RNA, effective reproduction becomes unlikely, also when collisions occur in cells, cell division is often suppressed. For purposes of legislation doses are divided into low (up to 1 kGy), medium (1 kGy to 10 kGy), and high-dose applications (above 10 kGy). High-dose applications are above those currently permitted in the US for commercial food items by the FDA and other regulators around the world. Though these doses are approved for non-commercial applications, such as sterilizing frozen meat for NASA astronauts (doses of 44 kGy) and food for hospital patients.

Sterilization of kava juice or kava product by high energy ionizing radiation offers substantial capacity as a substitute to the conventional use of thermal energy for such fortitudes. It is expected that this ionization treatment would reduce considerably the microbes and improve the shelf life of kava juice. In radiation sterilization technique, sterilization is performed under cold condition in which the temperature of the kava juice or kava product is not augmented to any momentous degree. But thermal sterilization needs that the temperature of the kava juice or kava product be elevated to a level which will deactivate all microbes present or likely to be present and inherently results in a product which displays those features found in a desperately over-cooked item, such as, loss of texture, flavor, color, vitamins, etc. To be able to sterilize kava juice or kava products without adversely affecting the properties of such kava products, as inherently results from thermal sterilization, is presently the goal by using ionizing radiation. In order to stabilize kava juice or kava product for long term storage at feasible temperatures, it is necessary to deactivate or destroy the enzymes and microorganisms normally present in kava juices or kava products. The process of enzyme deactivation is conventionally completed by raising the temperature of the kava juice or kava product until the enzyme proteins are denatured. The temperature required to deactivate enzymes is significantly below that required to deactivate some of the potentially harmful microorganisms present in the kava juice or kava product. When the kava juice or kava product is to be sterilized by ionizing radiation, such sterilization normally follows the thermal deactivation of the enzymes. The precooked radiation sterilized kava juice or kava product is produced by uniformly mixing at a temperature within the range of 145° F. to 175° F. This temperature range is also adequate to deactivate enzymes present in kava juice or kava product. The cooked kava juice or kava product is inserted within a gas-tight container and closed in the absence of oxygen. After packaging, the kava juice or kava product is then exposed to a dose of high energy ionizing radiation sufficient to eradicate all potentially harmful microorganisms that may be present Irradiation of the kava juice or kava product designated in this technique was done by exposing the kava juice or kava product to γ-radiation emitted from a 900.000 curie Cobalt 60 source. The physical arrangement of the electromagnetic radiation source comprised of a pair of spaced apart parallel plaques which contained the radio isotope Co-60. The kava juice or kava product to be treated are positioned within stacked aluminum canisters and carried by conveyor between the plaques for a period of time essential to reach the anticipated dosage level. In one embodiment, without precooking, the untreated kava juice or kava product after packaging is exposed to high energy ionizing radiation to destroy all potentially harmful microorganisms that may be present. In one embodiment untreated kava juice or kava product is canned and irradiated with γ-rays from Co-60 source at −30° C. to −40® C. and received a dose in the range of 3.5-6.5 megarads followed by cooling to room temperature of 25° C.

Example 1

Aerobic mesophilic plate count for the enumeration of bacteria is analyzed in the embodiment to determine the microbial counts for quality assessment of untreated kava root water extract. In the first step untreated kava root water extract homogenate is prepared by mixing the untreated kava root water extract with diluent peptone water (0.1%) in the ratio 1:10. The particulates of the untreated kava root water extract is allowed to settle for 2-3 minutes and then diluent containing the minimum particles of kava root extract is drawn for further analysis. The decimal solutions of drawn solution containing minimum particles of kava root extract were made by shaking each dilution 25 times in 30 cm arc. For each dilution new sterile pipette was employed in the analysis. This dilution is done by pipetting out 1 mL of untreated kava root extract homogenate into a tube containing 9 mL of the diluent peptone water. Four such dilution tubes are made in this analysis. Next step is pour plating in which labeled petri plates in which 1 mL of kava root extract homogenate and of such dilutions which have been selected for plating into a petri dish in duplicate is pipetted out and transferred. 10 mL of plate count agar (PCA) is poured within 15 minutes from the time of preparation of the original solution. Then mixing of media and dilutions is performed by swirling gently clockwise, anticlockwise, to and fro thrice and care has been taken for the contents not touching the lid and allowed to set. Next step involves incubation in which the prepared dishes are incubated and inverted at 35° C. for 48 hours. The final step of this analysis involves the counting of colonies of the incubated dishes and results are recorded per dilution counted. The result of aerobic mesophilic plate count for the enumeration of bacteria in untreated kava root water extract in this analysis is found to be $8.40 \times 10^6$ cfu/g. [Compendium of Methods for the Microbiological Examination of Foods (CMMEF, Chapter 8.72, APHA, $5^{th}$ Edition, 2015) is the reference used to perform this analysis].

Example 2

In this example, untreated kava product is subjected to ultra-high temperature (UHT) pasteurization and analysis is carried out for enumeration of aerobic bacteria as well as yeasts and molds for the UI-IT treated kava product. Up to 10% untreated kava root water extract is subjected to uninterruptedly run through a Tetra Pak VTIS direct steam injection ultra-high temperature (UHT) pasteurization system that uses a prewarming step of about 135° C. (275° F.) for about 36 seconds and then heat the sample to a temperature range of from about 135° C. (275° F.) to 190° C. (375° F.) for about 5 seconds. In this example, the ultra-pasteurizing temperature is about 375° F. The UH-IT treated kava product is then sent to a chilling condenser, which cools the UHT treated kava product to a temperature of from about 27° C. (80° F.) to 32° C. (90° F.) within 5 seconds. This cooling is with or without flash in this experiment. The UHT treated kava product is then run through a high-pressure homogenizer preferably at about 3000 to 5000 psi, or as low as 2000 psi. This process of the kava product includes with or without homogenization. Then the UHT treated kava product is kept at a reception temperature of 3.1° C. for 6 days and sent to an aseptic bag filler machine which sterilizes the bag with steam before it is filled with the sterilized UHT treated kava product. This packaging of the UHT treated kava product can be with or without aseptic packaging in the embodiment.

The final UHT treated kava product is checked for aerobic mesophilic plate count for the enumeration of bacteria as well as enumeration of yeasts and molds in the embodiment. Aerobic mesophilic plate count for the enumeration of bacteria is analyzed in the embodiment to determine the microbial counts for quality assessment of UHT treated kava product. In the first step UHT treated kava product homogenate is prepared by mixing the UHT treated kava product with diluent peptone water (0.1%) in the ratio 1:10. The particulates of the UHT treated kava product is allowed to settle for 2-3 minutes and then diluent containing the minimum particles of UHT treated kava product is drawn for further analysis. The decimal solutions of drawn solution containing minimum particles of UHT treated kava product were made by shaking each dilution 25 times in 30 cm arc. For each dilution new sterile pipette was employed in this analysis. This dilution is done by pipetting out 1 mL of UHT treated kava product homogenate into a tube containing 9 mL of the diluent peptone water. Four such dilution tubes are made in this analysis. Next step is pour plating in which labeled petri plates in which 1 mL of UHT treated kava product homogenate and of such dilutions which have been selected for plating into a petri dish in duplicate is pipetted out and transferred 10 mL of plate count agar (PCA) is poured within 15 minutes from the time of preparation of the original solution. Then mixing of media and dilutions is performed by swirling gently clockwise, anticlockwise and care has been taken for the contents not touching the lid and contents were allowed to set. Next step involves incubation in which the prepared dishes are incubated and inverted at 35° C. for 48 hours. The final step of this analysis involves the counting of colonies of the incubated dishes and results are recorded per dilution counted. The result of aerobic mesophilic plate count for the enumeration of bacteria in UHT treated kava product in this analysis is found to be <100 cfu/g [Compendium of Methods for the Microbiological Examination of Foods (CMMEF. Chapter 8.72, APHA, $5^{th}$ Edition, 2015) is the reference used to perform this analysis].

Analysis for the enumeration of yeasts and molds is performed in the embodiment to determine the microbial counts for quality assessment of UHT treated kava product.

Inoculation of 0.1 mL of appropriate decimal dilutions of the UHT treated kava product in duplicate onto the surface of dichloran rose bengal chloramphenicol (DRBC) agar was performed in the first step of the analysis. The plates used were dried overnight at room temperature. The process of spreading the inoculum over the entire surface of the plate using a sterile, bent-glass rod was performed followed by incubation of plates upright at 25° C. The growth of yeasts and molds were examined after 3-, 4- and 5-days incubation.

Predictable results for the formation of colonies of molds and yeasts were apparent within 5 days of incubation. The colonies of yeast and molds appear in pink color due to the uptake of rose bengal from DRBC agar. The enumeration of yeasts and molds in this analysis for the UHT treated kava product is found to be <10 cfu/g. [Compendium of Methods for the Microbiological Examination of Foods (CMMEF, Chapter 21.51, APHA, 5$^{th}$ Edition, 2015) is the reference used to perform this analysis].

The UHT treated kava product of example 2, after dilution with water at the mix proportions, when tested for sensory features by consumers, all fulfil the necessities of a kava product. The UHT treated kava product does not display any visible separation or coagulation or change in color. The aroma and taste of kava product satisfied the criteria without the negative attributes of features such as cooked, scorched, burnt, etc. Additionally, the UHT treated kava product has the texture and mouth sense of kava without the imperfections for kava product which may be described as coagulated, thin, moist, turbid, gritty or divided.

Example 3

In this example, untreated kava juice or untreated kava product kept in a pressurized steel vessel is subjected to microwave volumetric heating at 460 MHz to 2450 MHz in a microwave reactor. The heating was performed uniformly throughout the cylindrical vessel around the circumference of the cylinder and the kava juice or kava product is flowing under a plug flow regime. After exposing to microwave heating at frequency of 460 MHz the kava juice or kava product is allowed to cool at 25° C. On the similar ground, after exposing to microwave heating at frequency of 915 MHz, the kava juice or kava product is allowed to cool at 25° C. Another experiment is performed by exposing kava juice or kava product to microwave heating at frequency of 2450 MHz and the content is allowed to cool at 25° C. It is expected that this microwave volumetric heating treatment would reduce considerably the microbes and improve the shelf life of kava juice.

Example 4

In this example, untreated kava is cooked at about 238° C. (460° F.) while being exposed to high-pressures. Untreated kava is cooked for about 2-4 seconds and then pounded to a particle size of about 0.045 to 0.050 inches. This pounded untreated kava is agglomerated by adding 120 mL of water during the process of agglomeration. The formed particles or granules of wet concoction are allowed to dry using an oven preheated at temperature of 90° C. The drying is continued until the moisture content of the individual particles or granules are concentrated to 11 to 13 percent by weight. The dried untreated kava particles or granules were then placed between the hydraulically operated plates where they were exposed to a pressure of 450 MPa (65267 psi) and heated to a temperature of 238° C. (460° F.) for about 1 to 2 seconds. The pressure was speedily released so that the resulting HPP treated kava became puffed and the individual particles or granules form a sheet like structure with mosaic like appearance. The dried untreated kava or particles granules in another analysis were placed between the hydraulically operated plates where they were exposed to a pressure of 600 MPa (87022.6 psi) and heated to a temperature of 238° C. (460° F.) for about 1 to 2 seconds. The pressure was quickly released so that the resulting HPP treated kava became puffed and the individual particles form a sheet like structure with mosaic like appearance.

The above HPP treated kava product is checked for aerobic mesophilic plate count for the enumeration of bacteria as well as enumeration of yeasts and molds m the embodiment. Aerobic mesophilic plate count for the enumeration of bacteria is analyzed in the embodiment to determine the microbial counts for quality assessment of HPP treated kava product. In the first step HPP treated kava product homogenate is prepared by mixing the HPP treated kava product with diluent peptone water (0.1%) in the ratio 1:10. The particulates of the HPP treated kava product is allowed to settle for 2-3 minutes and then diluent containing the minimum particles of HPP treated kava product is drawn for further analysis. The decimal solutions of drawn solution containing minimum particles of HPP treated kava product were made by shaking each dilution 25 times in 30 cm arc. For each dilution new sterile pipette was employed in the analysis. This dilution is done by pipetting out 1 mL of HPP treated kava product homogenate into a tube containing 9 mL of the diluent peptone water. Four such dilution tubes are made in this analysis. Next step is plating in which labeled petri plates in which 1 mL of HPP treated kava product homogenate and of such dilutions which have been selected for plating into a petri dish in duplicate is pipetted out and transferred 10 mL of plate count agar (PCA) is poured within 15 minutes from the time of preparation of the original solution. Then mixing of media and dilutions is performed by swirling gently clockwise, anticlockwise and care has been taken for the contents not touching the lid and contents were allowed to set. Next step involves incubation in which the prepared dishes are incubated and inverted at 35° C. for 48 hours. The final step of this analysis involves the counting of colonies of the incubated dishes and results are recorded per dilution counted. The result of aerobic mesophilic plate count for the enumeration of bacteria in HPP treated kava product in this analysis is found to be 8000 cfu/g for the HPP treated kava product measured at pressure of 450 MPa and 5500 cfu/g for the HPP treated kava product measured at pressure of 600 MPa. [Compendium of Methods for the Microbiological Examination of Foods (CMMEF, Chapter 8.72, APHA, 5$^{th}$ Edition, 2015) is the reference used to perform this analysis].

Analysis for the enumeration of yeasts and molds is performed in the embodiment to determine the microbial counts for quality assessment of HPP treated kava product. Inoculation of 0.1 mL of appropriate decimal dilutions of the HPP treated kava product in duplicate onto the surface of dichloran rose bengal chloramphenicol (DRBC) agar is performed in the first step of the analysis. The plates used were allowed to dry overnight at room temperature. The process of spreading the inoculum over the entire surface of the plate using a sterile, bent-glass rod is performed followed by incubation of plates upright at 25° C. The growth of yeasts and molds were examined after 3-, 4- and 5-days of incubation. Predictable outcomes for the formation of colonies of molds and yeasts were apparent within 5 days of incubation. The colonies of yeast and molds appear in pink color due to the uptake of rose bengal from DRBC agar. The enumeration of yeasts in this analysis is found to be <10 cfu/g for HPP treated kava at the pressure of 450 MPa as well as 600 MPa. The enumeration of molds in this analysis is found to be <10 cfu/g for HPP treated kava at the pressure of 450 MPa as well as 600 MPa. [Compendium of Methods for the Microbiological Examination of Foods (CMMEF, Chapter 21.51, APHA, 5$^{th}$ Edition, 2015) is the reference used to perform this analysis].

Example 5

Particle sizes in the UHT treated kava juice were measured using a method utilizing Malvern Mastersizer instrument with water as the continuous phase using the 45 mm lens and the sample weighted was 0.689%. Ultrasound was applied to the Mastersizer tank for one minute before the measurement of the UHT treated kava juice under investigation. The surface weighted mean D[3.2] was calculated for UHT treated kava juice and the result is found to be 11.380 μm. The volume weighted mean D[4,3] was calculated for UHT treated kava juice and the result is found to be 31.962 μm for concentration of 0.0174% Vol.

Example 6

In this example, kava juice is sterilized at a sterilization temperature of 134° C. (274° F.), or a pasteurization temperature at 65° C. (149° F.) to 134° C. (274° F.) by high temperature short time (HTST) method. This method involves holding the heated kava juice at the temperature either sterilization or pasteurization for a selected holding time period of about 0.1 to 0.2 seconds to affect the destruction of the desired microorganisms. Then the heated kava juice is allowed to rapid cooling, for example, below 65° C. (149° F.) such as 5° C. (41° F.) to 25° C. (77° F.). This treatment includes with or without flash cooling, with or without homogenization and with or without aseptic packaging of the kava juice. In this example, heat sensitive kava juice is circulated during the heating, cooling and holding time periods.

Example 7

In this example, untreated kava juice can be treated using the device used for creating pulsed electric field (PEF). Nearly 45 kilovolts/cm field strength having a pulse duration of 3 microseconds was applied to effect 4 positive and 4 negative pulses per second of untreated kava juice. This PEF treatment involves a total of 35 positive and 35 negative pulses. The heating was maintained at 35° C. to 40° C. or below 40 C during the processing of kava juice. The cold-water circulation was maintained to control the temperature of the heating process and water circulation in this example is performed at 10° C. to 15° C. It is expected that processing of kava juice in this PEF treatment would decreases the microbes considerably and enhance the shelf life of kava juice.

Example 8

In this example, untreated kava juice is subjected to non-ionizing radiation sterilization treatment namely microwave irradiation, after being placed in a bottle and the bottle capped. The microwave irradiation was performed about 50 to 60 seconds and the raise in temperature of the come-up zone is about 78'(2 to 80° C. of the system. The capped kava juice was maintained at a target temperature of about 78° C. for about 1 to 2 minutes. The bottle and the product were then allowed to cool at 25° C. It is expected that this non-ionization treatment would reduce microbes reasonably and extend the shelf life of kava juice.

Example 9

In this example, untreated kava juice is subjected to ionizing radiation sterilization technique namely γ-rays irradiation using Cobalt-60 as radiation source. Untreated kava juice is canned and irradiated with γ-rays from Co-60 source at −30° C. to −40° C. and received a dose in the range of 3.5 to 6.5 megarads. Following ionizing radiation sterilization, the sterilized kava juice is allowed to cool at 25° C. It is expected that this ionization treatment would reduce considerably the microbes and improve the shelf life of kava juice.

Example 10

Appropriate carbohydrate degrading enzymes, lipases and proteases are all commercially obtainable. Enzymes by definition are not exhausted by reaction with their substrate. Therefore, while there is no minimum or maximum amount of enzyme that can be added to the kava juice or kava product, the amount will normally be determined based on the rate at which the enzyme acts under the circumstances where the substrate is to be digested. For example, at pH 5.0 and 35° C. in the upper part of the lower intestine, time taken for the amount of substrate to be digested, divided by the time taken for the kava juice or kava product passes via the intestine. Since there are issues related to enzyme stability and interference from other ingredients in the kava juice or kava product, a surplus of enzyme will generally be provided. Use of protein microspheres for encapsulation of biologically labile enzymes are added as supplement in kava juice or kava product and projected for release in the gastrointestinal tract. Most appropriate polymers for use as protein microspheres are hydrolytically unstable and can be considered to degrade within a limited hour of exposure to water. These would be used in dried or lyophilized requirements, so that release would be started at the time of rehydration and significantly finished at the time the kava juice or kava product reached the small intestine.

What is claimed is:

1. A method comprising: heating a kava product to a pasteurization temperature at about 135° C. or above; homogenizing the kava product; wherein the method is configured to stabilize the kava product against microbiological decomposition or reduce microbial count in order to improve safety and extend shelf life under refrigeration and/or at ambient temperature.

2. The method of claim 1, further comprising packaging of the kava product, wherein the packaging the kava product comprises an aseptic packaging.

3. The method of claim 1, further comprising adding a processing aid to the kava product at any stage of the method, wherein the processing aid comprises a substance used in a production of a processed food.

4. The method of claim 3, wherein the processing aid comprises an enzyme.

5. The method of claim 1, wherein the kava product comprises one or more of:
a kava juice or a kava root water extract; a kava juice or a kava root water extract in beverages, aerated beverages, a raw kava product frozen; and a raw kava product at room temperature; wherein the kava product contains two or more of kavain, methysticin, desmethoxyangonin, yangonin, dihydrokavain and dihydromethysticin.

6. The method of claim 1, further comprising exposing the kava product to an ionizing radiation.

7. The method of claim 1, wherein the kava product is heated at the pasteurization temperature in a range about 135° C. to about 190° C.

8. The method of claim 7, further comprising cooling the kava product after heating to a temperature of about 27° C. to about 32° C. to obtain an ultra-high temperature (UHT) treated kava product.

9. The method of claim 8, further comprises exposing the UHT treated kava product to a pressure.

10. The method of claim 9, wherein the pressure is about 3000 psi to about 5000 psi.

11. A method comprising: heating a kava product to a sterilization temperature about 135° C. or above; homogenizing the kava product; wherein the method is configured to stabilize the kava product against microbiological decomposition and prepare a shelf-stable kava product and reduce microbial count in order to improve safety and extend shelf life under refrigeration and/or at ambient temperature; wherein the kava product comprises: a kava juice or a kava root water extract; a kava juice or a kava root water extract in beverages, aerated beverages, wherein the kava product contains two or more of kavain, methysticin, desmethoxyangonin, yangonin, dihydrokavain and dihydromethysticin.

12. The method of claim 11, further comprising exposing the kava product to ionizing radiation.

13. The method of claim 11, further comprising packaging the kava product, wherein the packaging the kava product comprises aseptic packaging of the kava product.

14. The method of claim 11, wherein the kava product is heated at the sterilization temperature in a range from about 135° C. to about 190° C.

15. The method of claim 14, wherein the kava product after heating is cooled at a temperature of about 27° C. to about 32° C. to obtain an ultra-high temperature (UHT) treated kava product.

16. The method of claim 15, further comprises exposing the UHT treated kava product to a pressure.

17. The method of claim 16, wherein the pressure is about 3000 psi to about 5000 psi.

* * * * *